F. BURTT.
DRIVING OR TRANSMISSION GEARING.
APPLICATION FILED FEB. 24, 1914.
1,203,846.
Patented Nov. 7, 1916.
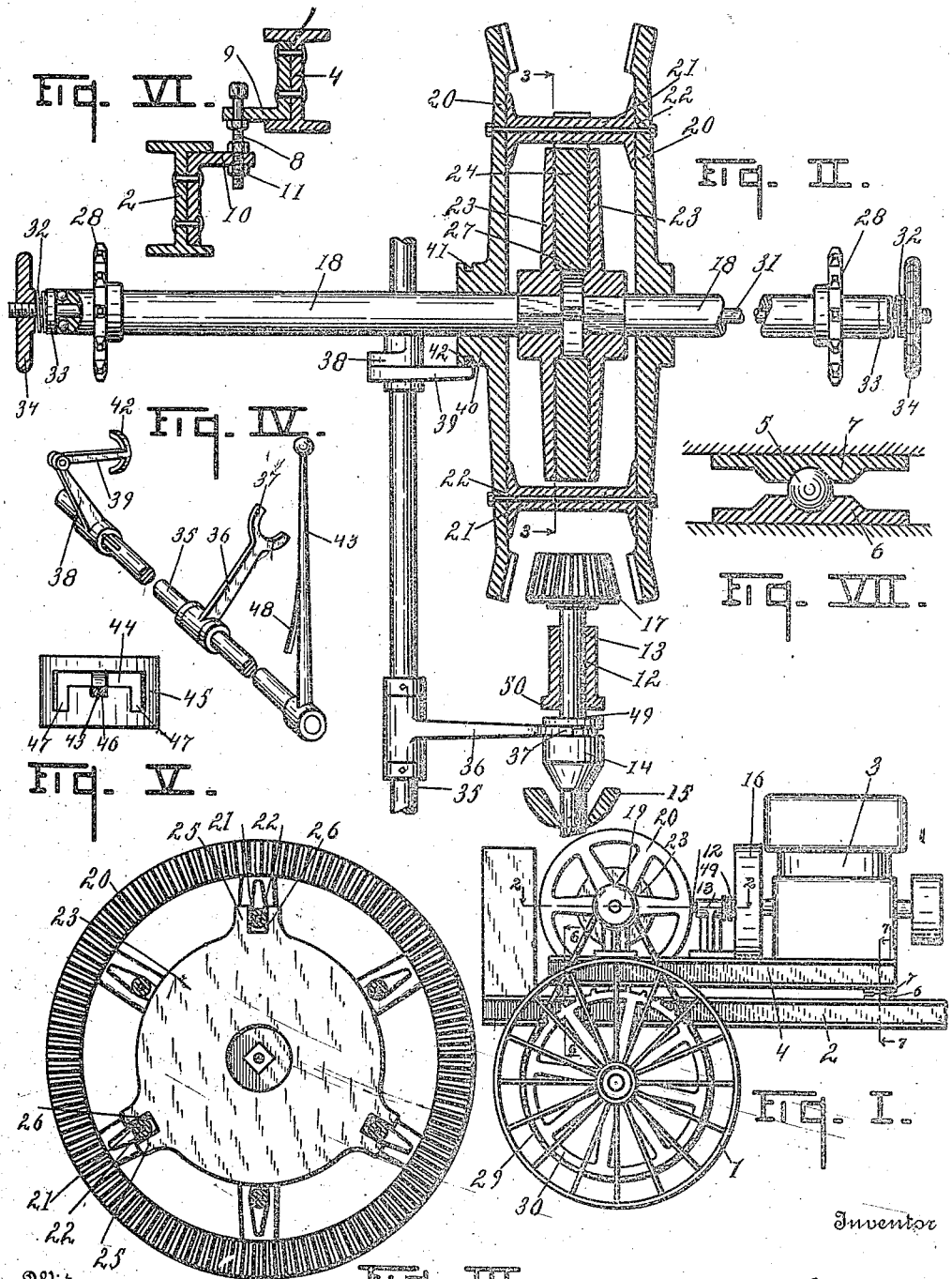

UNITED STATES PATENT OFFICE.

FRANK BURTT, OF KALAMAZOO, MICHIGAN, ASSIGNOR OF ONE-HALF TO WILL KROM-DYKE, JR., OF PORTAGE TOWNSHIP, MICHIGAN.

DRIVING OR TRANSMISSION GEARING.

1,203,846.

Specification of Letters Patent.

Patented Nov. 7, 1916.

Application filed February 24, 1914. Serial No. 820,437.

*To all whom it may concern:*

Be it known that I, FRANK BURTT, a citizen of the United States, residing at Kalamazoo, Michigan, have invented certain new and useful Improvements in Driving or Transmission Gearing, of which the following is a specification.

This invention relates to improvements in driving or transmission gearing.

My improved driving or transmission gearing is especially designed by me for use on tractors, heavy motor trucks and the like, and I have illustrated the same embodied in a tractor plow. My improvements are, however, desirable for use and may be readily embodied in various other structures.

The main objects of this invention are: First, to provide an improved driving or transmission gearing. Second, to provide an improved driving or transmission gearing adapted as a differential and reversing gear. Third, to provide an improved driving or transmission gearing having these advantages which is well adapted to withstand severe strains and is simple in structure.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a detail side elevation of a tractor plow structure embodying the features of my invention. Fig. II is a detail view of my improved transmission gearing partially in section, on a line corresponding to line 2—2 of Fig. I. Fig. III is a detail vertical section on a line corresponding to line 3—3 of Fig. II. Fig. IV is a detail perspective view of the control shaft removed from the machine. Fig. V is a plan view of the control shaft catch plate for the control shaft lever, the lever being shown in section. Fig. VI is a detail vertical section through the running gear and motor frames, on a line corresponding to line 6—6 of Fig. I, showing details of the adjustable motor frame support. Fig. VII is a detail vertical section on a line corresponding to line 7—7 of Fig. I, showing details of the support for the front of the motor frame.

In the drawing, similar reference characters refer to similar parts throughout the several views, and the sectional views are taken looking in the direction of the little arrows at the ends of the section lines.

Referring to the drawing, the traction wheels 1 are shown mainly in conventional form, as is also the running gear frame 2 and the motor 3. The motor is carried by the motor frame 4, the forward end of which is supported on the bearing ball 5 arranged in suitable centrally disposed bearing members 6 and 7 on the running gear frame and motor frame respectively.

The rear end of the motor frame is supported by the adjusting bolts 8 which are arranged through brackets 9 on the motor frame and brackets 10 on the running gear frame. See Fig. VI. The bolt is provided with nuts 11 for adjustment.

The driving shaft 12 is supported in a suitable bearing 13. Splined to this driving shaft is a cone clutch member 14 adapted to shift into and out of engagement with the cone clutch member 15 on the fly wheel 16. The shaft 12 is provided with a beveled driving gear 17.

A pair of driven transmission shafts 18 are mounted transversely of the motor and running gear frames in suitable bearing pedestals 19 on the motor frame. Sleeved upon these shafts for rotative and longitudinal movement is a pair of driven beveled gears 20 arranged facing and adapted to be shifted to bring either one into mesh with the gear 17 or to disengage both of them, the gears being shown in their disengaged position in Fig. II. These gears 20 are connected to rotate as one by the cross members or spools 21 and the bolts 22 arranged through the cross members.

A pair of facing driven friction disks 23 is arranged on the shafts 18 between the driven gears 20. The driving friction disk 24 is arranged between the driven friction disks to coact therewith and provided with driving lugs 25 engaging part of the cross members for the gears 20, the lugs being radially slotted at 26 to engage the cross members, thereby providing a driving connection between the gears 20 and the driven disks and permitting longitudinal adjustment of the driven gears to shift either one into mesh with the driving gear or to disconnect both as stated. The driven disks are provided with hub-like bearings 27 for the disk 24.

The driven shafts are provided with sprockets 28 which are connected by the sprocket chains 29 to the sprockets 30 on the traction wheels.

Arranged longitudinally through the driven shafts, is a rod 31 having coiled springs 32 arranged at its ends to engage the thrust bearing members 33 on the ends of the shaft members. The springs are supported at their outer ends by the adjusting members 34 threaded upon the rod for adjustment, thus regulating the tension of the springs and consequently the frictional pressure of the disks. I show the frictional pressure springs at both ends of the rod, with adjusting means at each end. It is not, however, essential to provide springs at each end. By this simple means I provide a friction differential which is well adapted for heavy tractors or motor vehicles or the like where the transmission is subject to heavy strains and it is desired to provide an effective and simple structure capable of withstanding very heavy loads, and at the same time, to provide means whereby both traction wheels are driven but in which the driving connection of one may slip when the strain thereon exceeds a predetermined point. The shifting of the gears to reverse is accomplished by the rock shaft 35 which is supported for rotative and longitudinal or axial movement. On this control shaft is an arm 36 having fork 37 adapted to engage the clutch member 14 for shifting the same as the control shaft is moved longitudinally. The control shaft is provided with a second arm 38 connected by the link 39 to one of the gears 20, the hub 40 of which is grooved at 41 to receive the forked end 42 of the link 39 so that the gears are shifted by the rotative movement of the shaft.

The lever 43 is arranged through the E-shaped slot 44 in the locking plate 45. The central arm or notch 46 of the plate 45 is disposed to receive the lever when the rock shaft is in its neutral position. The end notches 47 are adapted to receive and retain the lever in its forward and reversing positions. The lever is provided with a spring 48 which, engaging the edge of the slot, retains the lever in its adjusted positions. This provides a simple and effective control means whereby the transmission may be moved to neutral or to forward or direct positions and is effectively retained in such positions. By this arrangement, the clutch member 14 is always disengaged when the control shaft is actuated to shift the gears 20.

To stop the driving shaft when the gear is shifted, the clutch member 14 is provided with a brake member 49 adapted to coact with a brake member 50 on the bearing for the driving shaft, see Fig. II, so that, when the control lever is actuated to shift the gears, the brake is applied to the driving shaft.

I have illustrated and described my improvements quite in detail in a satisfactory embodiment thereof. I have not attempted to illustrate or describe various modifications which I contemplate, as I believe the disclosure herein made, will enable those skilled in the art to which this invention relates to embody or adapt the same as conditions may require, and I desire to be understood as claiming my improvements specifically in the form illustrated as well as broadly within the scope of the appended claims.

Having thus described my invention, what I claim as new and desire to secure by Letters Patent is:

1. In a structure of the class described, the combination of a driving shaft; a control clutch for said shaft comprising a shifting clutch member splined to said shaft; a beveled driving gear on said driving shaft; a pair of alined driven shafts; a pair of facing beveled gears connected by cross members mounted on said driven shafts for rotative and axial movement thereon; driven friction disks secured to said driven shafts; a driving friction disk disposed between said driven friction disks to coact therewith and having driving lugs radially slotted to engage said cross members of said driven gears and permitting their axial movement so that either may be brought into mesh with said driving gear, said driven disks being provided with bearings for said driving disk; a rod arranged longitudinally through said driven shafts; coiled springs arranged on said rod, thrust bearing members between said springs and the ends of said driven shafts; adjusting members threaded upon said rod to act on said springs; a control shaft supported for longitudinal and rotative movement; an arm on said control shaft engaging said shifting clutch member to actuate the same upon the longitudinal movement of said control shaft; a gear shifting arm on said control shaft connected to said driven gears whereby said gears are shifted by the rotative movement of said control shaft; and means for retaining said control shaft in its adjusted positions.

2. In a structure of the class described, the combination of a driving shaft; a control clutch for said shaft comprising a shifting clutch member splined to said shaft; a beveled driving gear on said driving shaft; a pair of driven shafts; a pair of facing beveled gears connected by cross members mounted on said driven shafts for rotative and axial movement thereon; driven friction disks secured to said driven shafts; a driving friction disk disposed between said driven friction disks to coact therewith and having driving lugs radially slotted to engage said cross members of said driven gears and permitting their axial movement so that either may be brought into mesh with said driving gear, said driven disks being provided with bearings for said driving disk; a control shaft supported for longitudinal and rotative movement; an arm on said control shaft engaging said shifting clutch member to actuate the same upon the longitudinal movement of said control shaft; a gear shifting arm on said control shaft connected to said driven gears whereby said gears are shifted by the rotative movement of said control shaft; and means for retaining said control shaft in its adjusted positions.

3. In a structure of the class described, the combination of a driving shaft; a beveled driving gear on said driving shaft; a pair of alined driven shafts; a pair of facing beveled gears connected by cross members mounted on said driven shafts for rotative and axial movement thereon; driven friction disks secured to said driven shafts; a driving friction disk disposed between said driven friction disks to coact therewith and having driving lugs radially slotted to engage said cross members of said driven gears and permitting their axial movement so that either may be brought into mesh with said driving gear, said driven disks being provided with bearings for said driving disk; a rod arranged longitudinally through said driven shafts; coiled springs arranged on said rod, thrust bearing members between said springs and the ends of said driven shafts; and adjusting members threaded upon said rod to act on said springs.

4. In a structure of the class described, the combination of a driving shaft; a beveled driving gear on said driving shaft; a pair of driven shafts; a pair of facing beveled gears connected by cross members mounted on said driven shafts for rotative and axial movement thereon; driven friction disks secured to said driven shafts; and a driving friction disk disposed between said driven friction disks to coact therewith and having driving lugs radially slotted to engage said cross members of said driven gears and permitting their axial movement so that either may be brought into mesh with said driving gear, said driven disks being provided with bearings for said driving disk.

5. In a structure of the class described, the combination of a driving shaft; a control clutch for said shaft comprising a shifting clutch member splined to said shaft; a beveled driving gear on said driving shaft; a pair of driven shafts; a pair of connected facing beveled gears mounted on said driven shafts for rotative and axial movement thereon; driven friction disks secured to said driven shafts; a driving friction disk coacting with said driven friction disks and having driving connection with said driven gears; a rod arranged longitudinally through said driven shafts; an adjusting member on said rod; a spring interposed between said adjusting member and one of said driven shafts; a control shaft supported for longitudinal and rotative movement; an arm on said control shaft engaging said shifting clutch member to actuate the same upon the longitudinal movement of said control shaft; a gear shifting arm on said control shaft connected to said driven gears whereby said gears are shifted by the rotative movement of said control shaft; and means for retaining said control shaft in its adjusted positions.

6. In a structure of the class described, the combination of a beveled driving gear; a pair of driven shafts; a pair of connected facing beveled gears mounted on said driven shafts for rotative and axial movement thereon; driven friction disks secured to said driven shafts; a driving friction disk coacting with said driven friction disks and having driving connection with said driven gears; a rod arranged longitudinally through said driven shafts; an adjusting member on said rod; and a spring interposed between said adjusting member and one of said driven shafts.

7. In a structure of the class described, the combination of a driving shaft; a beveled driving gear; a control clutch for said shaft; a pair of driven shafts; a pair of facing beveled gears connected by cross members mounted on said driven shafts for rotative and axial movement thereon whereby either may be shifted into mesh with said driving gear; driven friction disks secured to said driven shafts; a driving friction disk disposed between said driven friction disks to coact therewith and slotted to engage said cross members of said driven gears and permitting their axial movement; a rod arranged longitudinally through said driven shafts; a coiled spring arranged to act on said driven shafts, a thrust bearing member between said spring and one of said driven shafts; an adjusting member on said rod for adjusting the tension of said spring; and means for shifting said driven gears.

8. In a structure of the class described, the combination of a driving shaft; a beveled driving gear; a control clutch for said shaft; a pair of driven shafts; a pair of facing beveled gears connected by cross members mounted on said driven shafts for rotative and axial movement thereon whereby either may be shifted into mesh with said driving gear; driven friction disks secured to said driven shafts; a driving friction disk disposed between said driven friction disks to coact therewith and slotted to engage said cross members of said driven gears and permitting their axial movement; and means for shifting said driven gears.

9. In a structure of the class described, the combination of a driving shaft; a control clutch for said shaft comprising a shifting clutch member splined to said shaft; a beveled driving gear on said driving shaft; a pair of driven shafts; a pair of connected facing beveled gears mounted on said driven shafts for rotative and axial movement thereon; driven friction disks disposed between said pair of gears, secured to said driven shafts; a driving friction disk coacting with said driven friction disks and having driving connection with said driven gears; means for adjusting the frictional pressure on said friction disks; a control shaft supported for longitudinal and rotative movement; an arm on said control shaft engaging said shifting clutch member to actuate the same upon the longitudinal movement of said control shaft; a gear shifting arm on said control shaft connected to said driven gears whereby said gears are shifted by the rotative movement of said control shaft; and means for retaining said control shaft in its adjusted positions.

10. In a structure of the class described, the combination of a beveled driving gear; a pair of driven shafts; a pair of connected facing beveled gears mounted on said driven shafts for rotative and axial movement thereon; driven friction disks disposed between said pair of gears, secured to said driven shafts; a driving friction disk coacting with said driven friction disks and having driving connection with said driven gears; and means for adjusting the frictional pressure on said friction disks.

11. The combination of a pair of driven friction members, a driving friction member disposed between and coacting with said driven friction members, a rod disposed axially through said friction members, coiled springs arranged to act on said driven friction members, and thrust members for the outer end of said springs carried by said rod.

12. The combination of a pair of alined driven shafts, a pair of driven friction disks secured to said driven shafts, a driving friction disk disposed between and coacting with said driven friction disks, a rod arranged through said driven shafts, coiled springs arranged to act on the outer end of said driven shafts, and thrust members for the outer ends of said springs carried by said rod.

13. The combination of a beveled driving gear, a pair of facing beveled driven gears, a pair of alined tubular driven shafts on which said driven beveled gears are mounted for rotative and longitudinal movement whereby either may be shifted into mesh with said driving gear, a pair of driven friction disks disposed between said driven gears and secured to said driven shafts, a driving friction disk disposed between and coacting with said driven friction disk, said driving friction disk having driving connection with said driven gears, a rod arranged through said driven shafts for longitudinal movement therein, springs arranged to act on said driven shafts, and thrust members for the outer ends of said springs carried by said rod.

14. The combination of a beveled driving gear, a pair of facing beveled driven gears, a pair of alined tubular driven shafts on which said driven beveled gears are mounted for rotative and longitudinal movement whereby either may be shifted into mesh with said driving gear, a pair of driven friction disks disposed between said driven gears and secured to said driven shafts, and a driving friction disk disposed between and coacting with said driven friction disk, said driving friction disk having driving connection with said driven gears.

15. The combination of a beveled driving gear, a pair of driven shafts, a pair of facing beveled gears mounted on said driven shafts for rotative and axial movement whereby either may be shifted into mesh with said driving gear, said pair of gears being connected, driven friction disks secured to said driven shafts, a driving friction disk disposed between said driven friction disk to coact therewith, a connection for said driving friction disk to said driven gears permitting their axial movement, means for shifting said driven gears, springs acting to hold said driven friction disks in frictional engagement with said driving disk, and means for adjusting the tension of said springs.

In witness whereof, I have hereunto set my hand and seal in the presence of two witnesses.

FRANK BURTT. [L. S.]

Witnesses:
LUELLA G. GREENFIELD,
ANNIE E. PARRY.